United States Patent Office 3,097,455
Patented July 16, 1963

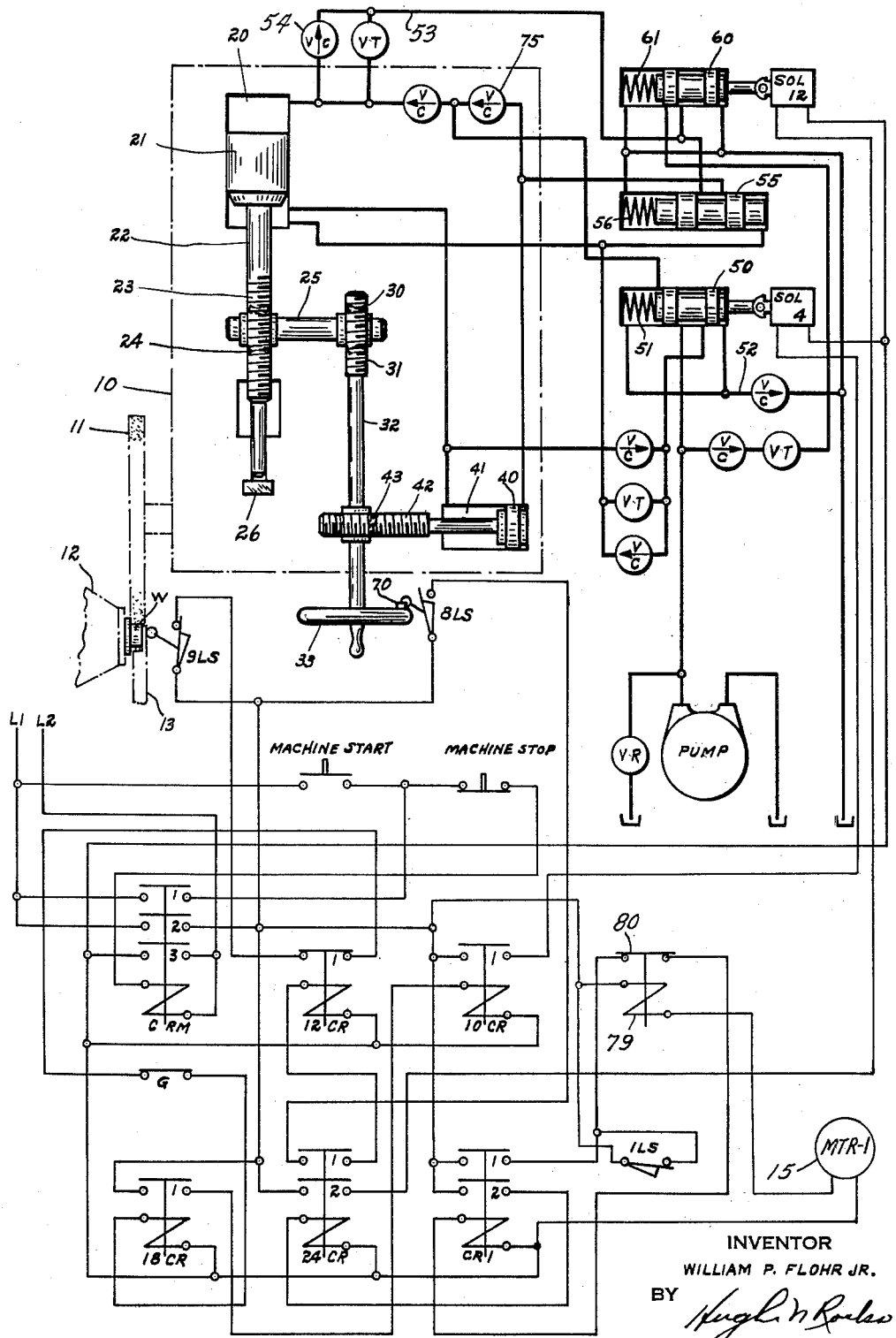

3,097,455
WHEEL APPROACH CONTROL WITH FEED SAFETY DEVICE
William P. Flohr, Jr., Waynesboro, Pa., assignor to Landis Tool Company, Waynesboro, Pa.
Filed Dec. 27, 1960, Ser. No. 78,598
8 Claims. (Cl. 51—165)

This invention relates to grinding machines in which workpieces are automatically and successively presented to a grinding wheel for grinding.

The invention also relates to a feed mechanism for a grinding wheel in which the rate of feed is changed when the grinding wheel engages a workpiece. Such a feed mechanism is disclosed in co-pending application, Serial No. 731,681, filed April 29, 1958, now U.S. Patent No. 2,984,952, granted May 23, 1961.

From time to time, the work feeding mechanism fails to supply a workpiece in position for grinding. However, because of the nature of the machine, the wheel feed mechanism will go through the grinding cycle without grinding. This represents a decided loss in time. One method of preventing the occurrence of the grinding cycle in the absence of a workpiece is the use of a limit switch which will prevent operation of the feed mechanism if there is no work in grinding position. It is desirable, however, to provide means for accomplishing the same function without the necessity of the workpiece operated limit switch.

It is, therefore, an object of the present invention to provide means for interrupting the grinding cycle if there is no workpiece in position to be ground.

Another object is to provide means for interrupting the grinding cycle when the grinding wheel passes a certain point in the cycle without the usual change in load resulting from engagement with a workpiece.

The drawing is a hydraulic and electric diagram in which the wheel support, grinding wheel, work support, and the work loading arm are shown diagrammatically.

Grinding wheel 11 is rotatably supported on wheel support 10 and rotated by motor 15. Workpiece W is rotatably supported on headstock 12. Workpiece W is moved into and out of operative relation to headstock 12 and grinding wheel 11 by means of a loading arm 13. Such a machine is shown in greater detail in U.S. Patent 2,694,883, granted November 23, 1954, and in U.S. Patent 2,874,518, granted February 24, 1959.

Grinding wheel 11 is moved transversely toward and from workpiece W by means of a feed mechanism consisting of a rapid feed cylinder 20 in which piston 21 is slidably mounted. Piston 21 is attached to feed screw 22 having screw threads 23 in operative engagement with the teeth of a worm wheel 24 on feed shaft 25 rotatably mounted in wheel support 10.

The relation between feed screw 22 and worm wheel 24 may be either that of a rack and pinion or a worm and worm wheel. In either case, feed shaft 25 moves with wheel support 10. Rapid feed cylinder 20 and feed screw 22 are supported in the bed (not shown) of the machine.

At the other end of feed shaft 25 is a worm gear 30 in operative engagement with worm 31 on shaft 32. Shaft 32 may be rotated by hand wheel 33 or by a hydraulic actuating device consisting of a slow feed piston 40 in cylinder 41. Piston 40 is connected to rack 42 which, in turn, is connected to pinion 43 on shaft 32.

Operation

When loading arm 13 moves into position to place a workpiece W in operative relation to headstock 12, it operates limit switch 9LS to complete a circuit through normally closed relay contact 12CR1 and normally closed gauge contact G to energize relay 18CR.

Relay contact 18CR1 completes a circuit to energize infeed relay 10CR.

Relay contact 10CR1 completes a circuit to energize infeed valve solenoid 4, shifting infeed valve 50 to the left and directing fluid under pressure to the upper end of rapid feed cylinder 20. An extension 53 of the line from infeed valve 50 to rapid feed cylinder 20 including a check valve 54 conducts fluid through feed slow down pilot valve 55 to slow feed cylinder 41.

Wheel support 10 is advanced rapidly by means of piston 21 to positive stop 26 in order to place grinding wheel 11 in position to start a grinding operation.

Exhaust pressure from rapid feed cylinder 20 is directed to the right hand end of feed slow down pilot valve 55, shifting valve 55 to the left against spring 56 and preventing the flow of fluid under pressure to slow feed cylinder 41.

At the end of the rapid feed movement, exhaust fluid pressure from rapid feed cylinder 20 is reduced to a point where it is overcome by spring 56 which shifts feed slow down pilot valve 55 to its right hand position.

When grinding wheel 11 is retracted at the end of a grinding operation, it closes limit switch 1LS, completing a circuit to energize load relay CR1.

Relay contact $CR1_1$ provides a holding circuit for relay CR1 when wheel support 10 advances for the next grinding operation and opens limit switch 1LS.

Relay contact $CR1_2$ completes a circuit to energize relay 24CR.

Relay contact 24CR2 completes a circuit to energize valve solenoid 12 to shift feed slow down valve 60 to the left against spring 61. In this position, feed slow down valve 60 directs fluid under pressure through valve 55 to supplement the supply of fluid which is provided by infeed valve 50 through extension 53 and valve 55 to slow feed cylinder 41.

Slow feed piston 40 rotates hand wheel shaft 32 and feed shaft 25 to advance wheel support 10 relative to feed screw 22 at a rate slightly faster than rough grinding feed.

When there is a workpiece W in position for grinding, the engagement of grinding wheel 11 with said workpiece results in an increase in the load on the grinding wheel driving motor 15. This increase in load acts through well known electrical devices which includes a load relay 79 having a normally closed contact 80 which opens to deenergize relay CR1.

Relay contact $CR1_2$ opens to deenergize feed slow down relay 24CR.

Relay contact 24CR1 in the circuit to relay 12CR opens and when hand wheel 33 has been turned by piston 40 and grinding wheel 11 advanced to a point at which hand wheel cam 70 actuates limit switch 8LS, relay 12CR remains deenergized.

Normally closed relay contact 12CR1 in the circuit to relay 18CR remains closed and said relay energized.

Infeed valve solenoid 4 remains energized, holding infeed valve 50 in the left hand or feeding position until workpiece W is ground to size.

Relay contact 24CR2 opens to deenergize valve solenoid 12. Valve 60 is shifted to the right by spring 61 to cut off the supply of fluid passing through valve 60 to valve 55 and cylinder 41. This leaves only the fluid from valve 50 and extension 53 to operate piston 40 at a correspondingly slower speed for the remainder of the grinding operation.

When workpiece W is ground to size, normally closed gauge contact G in the circuit to relay 18CR opens, deenergizing relay 18CR and opening relay contact 18CR1 and deenergizing infeed relay 10CR.

Relay contact 10CR1 opens, deenergizing infeed valve solenoid 4.

Spring 51 returns infeed valve 50 to the right hand position, directing fluid under pressure to the lower end of rapid feed cylinder 20 to shift piston 21, wheel support 10 and grinding wheel 11 away from grinding position.

Fluid under pressure from the lower end of rapid feed cylinder 20 is directed to the left end of slow feed cylinder 41 to reset feed screw 22 by shifting piston 40 to the right.

Exhaust fluid from the right hand end of slow feed cylinder 41 is directed through check valve 75 to the left end of infeed valve 50 through which it is connected to exhaust line 52 from infeed valve 50.

If there is no workpiece in the machine, there will be no change in load on the wheel drive motor 15 and relay contact $CR1_2$ will remain closed and relay 24CR will remain energized.

Relay contact 24CR1 in the circuit to relay 12CR will remain closed so that when the feed movement has advanced to the point where feed completion limit switch 8LS is closed, relay 12CR will be energized.

Normally closed relay contact 12CR1 will be deenergized, opening the circuit to relay 18CR.

Relay contact 18CR1 will open, deenergizing infeed relay 10CR and infeed valve solenoid 4 to return the feed mechanism to starting position.

This procedure will be repeated until a workpice W is placed in position to be engaged by grinding wheel 11.

I claim:

1. In a grinding machine, a work support and a wheel support, means for rotatably supporting a grinding wheel on said wheel support, means for rotatably supporting a workpiece on said work support, feeding means for feeding said grinding wheel toward and from said work support, feed rate reducing means operable when said grinding wheel engages a workpiece, means co-acting with said feed rate reducing means and actuated by said feeding means for reversing said feeding means and retracting said grinding wheel if there is no workpiece in position to be engaged by said grinding wheel.

2. In a grinding machine, a work support and a wheel support, means for rotatably supporting a grinding wheel on said wheel support, means for rotatably supporting a workpiece on said work support, feeding means for feeding said grinding wheel toward and from said work support, means for reducing the rate of operation of said feeding means when said grinding wheel engages a workpiece including a contact responsive to the load on said grinding wheel, and means co-acting with said contact in the absence of a workpiece for retracting said grinding wheel.

3. In a grinding machine, a work support and a wheel support, means for rotatably supporting a grinding wheel on said wheel support, means for rotatably supporting a workpiece on said work support, feeding means for feeding said grinding wheel toward and from said work support, means for reducing the rate of operation of said feeding means when said grinding wheel engages a workpiece including a contact responsive to the load on said grinding wheel, and means co-acting with said contact and operable by said feeding means after it has advanced to a predetermined point in the absence of a workpiece for retracting said grinding wheel.

4. In a grinding machine, a work support, a grinding wheel support, a grinding wheel rotatably mounted on said wheel support, a motor for driving said grinding wheel, a circut for supplying current to drive said motor, feeding means for feeding said grinding wheel toward and from said work support, control means for said feeding means, a load relay in the circuit to said motor having a normally closed contact which remains closed in the absence of a workpiece, and means actuated by said feeding means and co-acting with said load relay contact to reverse said feeding means and retract said grinding wheel.

5. In a grinding machine, a work support and a wheel support, means for rotatably supporting a grinding wheel on said wheel support, a motor for driving said grinding wheel, a control circuit for said motor, means for rotatably supporting a workpiece on said work support, feeding means for feeding said grinding wheel toward and from said work support, a solenoid for controlling said feeding means, a circuit for energizing said solenoid, means for reducing the rate of operation of said feeding means when said grinding wheel engages a workpiece including a load relay in said control circuit having a normally closed contact which remains closed in the absence of a workpiece in operative position in the machine, and means co-acting with said load relay contact and operable by said feeding means at a predetermined point in the movement of said grinding wheel toward said work support to retract said grinding wheel.

6. In a grinding machine, a work support and a wheel support, means for rotatably supporting a grinding wheel on said wheel support, a motor for driving said grinding wheel, a control circuit for said motor, means for rotatably supporting a workpiece on said work support, feeding means for feeding said grinding wheel toward and from said work support, a solenoid for controlling said feeding means, a circuit for energizing said solenoid, means for reducing the rate of operation of said feeding means when said grinding wheel engages a workpiece including a load relay in said control circuit having a normally closed contact which remains closed in the absence of a workpiece in operative position in the machine, and means including a control member co-acting with said load relay contact and operable by said feeding means at a predetermined point in the movement of said grinding wheel toward said work support to retract said grinding wheel.

7. In a grinding machine, a work support and a wheel support, means for rotatably supporting a grinding wheel on said wheel support, a motor for driving said grinding wheel, a control circuit for said motor, means for rotatably supporting a workpiece on said work support, feeding means for feeding said grinding wheel toward and from said work support, means for reducing the rate of operation of said feeding means when said grinding wheel engages a workpiece including a load relay in said control circuit having a normally closed contact which remains closed if there is no workpiece to be engaged by the grinding wheel to change the rate of operation of said feeding means, and control means in co-acting relation with said normally closed contact in said load relay and operable by said feeding means at a predetermined point in the movement of said grinding wheel toward said work support to retract said grinding wheel to inoperative position.

8. In a grinding machine, a work support and a wheel support, means for rotatably supporting a grinding wheel on said wheel support, a motor for driving said grinding wheel, a control circuit for said motor, means for rotatably supporting a workpiece on said work support, feeding means for feeding said grinding wheel toward and from said work support, a solenoid for controlling said feeding means, a circuit for energizing said solenoid, means for reducing the rate of operation of said feeding means when said grinding wheel engages a workpiece including a load relay in said control circuit having a normally closed contact which remains closed in the absence of a workpiece in operative position in the machine, and means coacting with said normally closed contact in said load relay and operable by said feeding means at a predetermined point in the movement of said grinding wheel toward said work support to actuate said solenoid to retract said grinding wheel.

References Cited in the file of this patent

UNITED STATES PATENTS

| | | |
|---|---|---|
| 2,168,596 | Hall | Aug. 8, 1939 |
| 2,802,312 | Gosney et al. | Aug. 13, 1957 |